US012488677B2

(12) United States Patent
Qin et al.

(10) Patent No.: US 12,488,677 B2
(45) Date of Patent: Dec. 2, 2025

(54) BRACKET TAMPER DETECTION

(71) Applicant: RESIDEO LLC, Golden Valley, MN (US)

(72) Inventors: Xiaohui Qin, Shanghai (CN); Yongjun Chen, Shanghai (CN); Bin Shi, Shanghai (CN)

(73) Assignee: RESIDEO LLC, Golden Valley, MN (US)

( * ) Notice: Subject to any disclaimer, the term of this patent is extended or adjusted under 35 U.S.C. 154(b) by 0 days.

(21) Appl. No.: 18/255,517

(22) PCT Filed: Dec. 9, 2020

(86) PCT No.: PCT/CN2020/134806

§ 371 (c)(1),
(2) Date: Jun. 16, 2023

(87) PCT Pub. No.: WO2022/120623

PCT Pub. Date: Jun. 16, 2022

(65) Prior Publication Data

US 2024/0096205 A1 Mar. 21, 2024

(51) Int. Cl.
*G08B 29/04* (2006.01)
*G08B 13/12* (2006.01)

(52) U.S. Cl.
CPC ........... *G08B 29/046* (2013.01); *G08B 13/12* (2013.01)

(58) Field of Classification Search
CPC ...... G08B 13/12; G08B 29/046; G08B 13/06; G08B 13/1445; G08B 13/19619
See application file for complete search history.

(56) References Cited

U.S. PATENT DOCUMENTS 4,621,378 A 11/1986 Hatchman
4,873,936 A 10/1989 Ponticelli
(Continued)

FOREIGN PATENT DOCUMENTS

CN 200962248 Y 10/2007
CN 201184122 Y 1/2009
(Continued)

OTHER PUBLICATIONS

Mark Kretschmar, Lion Precision Sensors, "Capacitive Sensor Operation Part 1: The Basics", May 1, 2009, 6 pgs.
(Continued)

*Primary Examiner* — Omer S Khan
(74) *Attorney, Agent, or Firm* — Greenberg Traurig, LLP; Nicholas Martin; David J. Dykeman

(57) ABSTRACT

An assembly includes a premise security device, a mounting bracket, a first electrical cable, and a second electrical cable. The first electrical cable has a first electrical cable first end, connected to the premise security device controller, and a first electrical cable second end. The second electrical cable has a second electrical cable first end, electrically connected to the premise security device controller, and a second electrical cable second end. When the premise security device housing is coupled to the second mounting bracket portion, the second electrical cable second end is electrically connected to the first electrical cable second end to form an electrical circuit between the premise security device controller and the electrically connected electrical cable second ends. The premise security device controller is configured to monitor the presence of the electrical circuit and generate a tamper signal when the electrical circuit is no longer present.

20 Claims, 6 Drawing Sheets

(56) References Cited

U.S. PATENT DOCUMENTS

| | | | | |
|---|---|---|---|---|
| 5,764,729 | A | 6/1998 | Black et al. | |
| 6,089,626 | A | 7/2000 | Shoemaker | |
| 6,377,174 | B1 | 4/2002 | Siegwart et al. | |
| 7,004,784 | B2 | 2/2006 | Castle | |
| 7,292,145 | B2 | 11/2007 | Castle et al. | |
| 7,388,484 | B2 | 6/2008 | Hsu | |
| 7,528,717 | B2 | 5/2009 | Benjelloun et al. | |
| 9,269,241 | B2 | 2/2016 | Chiang et al. | |
| 9,761,098 | B2 | 9/2017 | Pai et al. | |
| 10,595,400 | B1 * | 3/2020 | Razaghi | H05K 1/0275 |
| 10,718,539 | B2 | 7/2020 | Matsuoka et al. | |
| 2005/0191878 | A1 * | 9/2005 | Castle | G08B 29/046 439/76.1 |
| 2005/0247085 | A1 | 11/2005 | Porter | |
| 2006/0197662 | A1 | 9/2006 | Castle et al. | |
| 2007/0040674 | A1 | 2/2007 | Hsu | |
| 2007/0236349 | A1 | 10/2007 | Ho Lee | |
| 2008/0084292 | A1 | 4/2008 | Dipoala | |
| 2009/0167538 | A1 | 7/2009 | Merritt et al. | |
| 2009/0320537 | A1 | 12/2009 | Alexander | |
| 2010/0295665 | A1 | 11/2010 | Landau et al. | |
| 2010/0321186 | A1 | 12/2010 | Crook | |
| 2010/0328056 | A1 | 12/2010 | Merkel et al. | |
| 2011/0031985 | A1 * | 2/2011 | Johnson | H05K 1/0275 324/681 |
| 2012/0152883 | A1 | 6/2012 | Zhang et al. | |
| 2012/0161976 | A1 | 6/2012 | Xie et al. | |
| 2012/0188081 | A1 | 7/2012 | Van Katwijk | |
| 2012/0319842 | A1 | 12/2012 | Amis | |
| 2013/0113397 | A1 | 5/2013 | Salter et al. | |
| 2013/0240739 | A1 | 9/2013 | Shpater | |
| 2013/0300453 | A1 * | 11/2013 | Carapelli | H03K 19/003 326/8 |
| 2015/0339568 | A1 | 11/2015 | Nekoogar et al. | |
| 2016/0196729 | A1 | 7/2016 | Pai et al. | |
| 2017/0365142 | A1 | 12/2017 | Pai et al. | |
| 2019/0244494 | A1 | 8/2019 | Grant et al. | |
| 2022/0268860 | A1 * | 8/2022 | Ghadiali | G01D 5/145 |

FOREIGN PATENT DOCUMENTS

| | | | |
|---|---|---|---|
| CN | 202406227 | U | 8/2012 |
| CN | 202794529 | U | 3/2013 |
| CN | 203733183 | U | 7/2014 |
| CN | 204406587 | U | 6/2015 |
| CN | 205987103 | U | 2/2017 |
| CN | 207010795 | U | 2/2018 |
| CN | 207337580 | U | 5/2018 |
| CN | 207354462 | U | 5/2018 |
| CN | 208638499 | U | 3/2019 |
| EP | 834847 | B1 | 10/2001 |
| EP | 1569182 | A1 | 8/2005 |
| EP | 2096608 | A2 | 9/2009 |
| FR | 2602078 | A1 | 1/1988 |
| GB | 2304222 | A | 3/1997 |
| GB | 2553289 | A | 3/2018 |

OTHER PUBLICATIONS

Mark Kretschmar, Lion Precision Sensors, "Capacitive Sensor Operation Part 2: System Optimization", Jun. 1, 2009, 5 pgs.

Thomas Perme et al., "Capacitive Touch Using Only an ADC ("CVD") AN1298", Microchip Technology Inc., DS01298A, Mar. 26, 2009, 4 pgs.

Atmel Delivers QTouch Capacitive Touch Controller, downloaded from http://sensorsmag.com/electronics-computers/news/atmel-delivers-qtouch-capacitive-touch-control . . . on Nov. 16, 2011, 2 pgs.

Cypress Semiconductor Corporation, "Cypress Perform, PSoC Programmable System-on-Chip" , Document No. 001-67345, Rev. * A, Revised May 13, 2011, 47 pgs.

NXP Semiconductors, "PCA8886—Dual channel capacitive proximity switch with auto-calibration and large voltage operating range", Rev. 1—Nov. 23, 2011, 26 pgs.

Semtech Launches Smart Proximity Sensor, downloaded from http://sensorsmag.com/electronice-computers/consumer/news/semtech-launches-smart-proximity-sensor-10190?print=1, dated Jun. 25, 2012, 3 pgs.

International Search Report and Written Opinion for International Application No. PCT/CN2020/0134806, mailed Sep. 7, 2021, English Translation, 9 pgs.

Atmel, "QTouch 12-channel Touch Sensor IC, AT42QT2120 [Preliminary]", 9634AX-AT42, Nov. 2011, 42 pgs.

Atmel, "Proximity Design Guide, Application Note QTAN0087", 10760A-AT42, Nov. 2011, 12 pgs.

Cypress Semiconductor, "Cypress Perform, CY3235-ProxDet, CapSense Proximity Detection Demonstration Kit Guide", Doc. #: 001-67986 Rev. * B, Oct. 14, 2011, 34 pgs.

European Search Report in European Application No. 20964567.0 mailed Sep. 4, 2024.

* cited by examiner

BRACKET TAMPER DETECTION

RELATED APPLICATIONS

This application is a 35 U.S.C. 371 national stage filing from International Application No. PCT/CN2020/134806, filed Dec. 9, 2020, the entire contents of which is incorporated herein by reference.

TECHNICAL FIELD

This disclosure relates generally to security devices as well as systems and methods relating to such security devices. More specifically, this disclosure describes embodiments of bracket tamper detection mechanisms, assemblies, systems, and related methods.

BACKGROUND

Security devices can be used to monitor one or more conditions at a premise and, when a predetermined event occurs, alert to the occurrence of that event. An intruder at the premise may attempt to defeat a security function of a security device by attempting to remove the security device from its mounting. The intent of the intruder in attempting to remove the security device could be to terminate a power supply and/or a communication link at the security device and, thereby, render the security function of that device ineffective.

SUMMARY

This disclosure in general describes bracket tamper detection embodiments as well as related systems and methods. In particular, embodiments disclosed herein can, for instance, facilitate enhanced security for premises security systems including mounted security devices by detecting when a mounting bracket associated with a security device is being tampered with.

To enhance the security of a device (e.g., a security device), it can be useful to detect an attempt to tamper with the security device. This disclosure in general describes detection of tampering with a mounting bracket, such as detecting removal of a security device housing from the mounting bracket and/or detecting removal of the mounting bracket from a mounting surface.

In general, there are two main types of tampering that a security device may be subjected to. The first type of tampering is the removal of one housing section of a security device from another housing section of the security device. Mechanical push buttons have been used in prior devices in an attempt to protect against removal of a portion of the housing of a security device. A mechanical push button is depressed when the first housing section and the second housing section are joined together and is released when the first housing section and the second housing section are removed from one another, indicating that the security device has been tampered with or sabotaged. The second type of tampering is the forcible removal of a device from its mounting support. For example, if an intruder were to pry a device from its mounting support the connection would likely be broken leaving little to nothing on the support structure as the device was removed. In such an example, the mechanical push button may not release and may not indicate the security device has been tampered with or sabotaged.

Accordingly, embodiments disclosed herein can detect when a mounting bracket, or other support, associated with a security device (e.g., for mounting the security device to a mounting surface) is being tampered with. More specifically, embodiments disclosed herein can detect removal of a security device housing from the mounting bracket and/or detecting removal of the mounting bracket from a mounting surface. This can enhance the security of a security device by detecting types of tampering that may not be detected by current tamper mechanisms. This, in turn, can provide improved tamper detection that can be utilized in a variety of mounted device applications.

One embodiment includes an assembly. This assembly embodiment includes a premise security device, a mounting bracket, a first electrical cable, and a second electrical cable. The premise security device includes a premise security device housing and a premise security device controller. The premise security device controller is coupled to the premise security device housing. The mounting bracket includes a first mounting bracket portion configured to be mounted to a mounting surface and a second mounting bracket portion configured to couple to the premise security device housing. The first electrical cable has a first electrical cable first end and a first electrical cable second end. The first electrical cable first end is electrically connected to the premise security device controller. The second electrical cable has a second electrical cable first end and a second electrical cable second end. The second electrical cable first end is electrically connected to the premise security device controller. When the premise security device housing is coupled to the second mounting bracket portion, the second electrical cable second end is electrically connected to the first electrical cable second end to form an electrical circuit between the premise security device controller and the electrically connected second electrical cable second end and first electrical cable second end. The premise security device controller is configured to monitor the presence of the electrical circuit and generate a tamper signal when the electrical circuit is no longer present.

In a further embodiment of the assembly, the premise security device controller is configured to generate the tamper signal when the second electrical cable second end is no longer electrically connected to the first electrical cable second end.

In a further embodiment of the assembly, the premise security device controller is configured to generate the tamper signal when one or both of the first electrical cable first end and the second electrical cable first end is no longer electrically connected to the premise security device controller.

In a further embodiment of the assembly, the assembly is configured such that when the premise security device housing is uncoupled from the second mounting bracket portion the second electrical cable second end is no longer electrically connected to the first electrical cable second end.

In a further embodiment of the assembly, the assembly further includes a fixation element configured to mount the first mounting bracket portion to the mounting surface. The second electrical cable second end is electrically connected to the first electrical cable second end via the fixation element.

In a further embodiment of the assembly, the assembly further includes a mounting plate configured to mount to the mounting surface adjacent the first mounting bracket portion. The second electrical cable second end is electrically connected to the first electrical cable second end via the mounting plate. For example, the first mounting bracket portion is configured to mount to the mounting surface over the mounting plate.

In a further embodiment of the assembly, the assembly further includes a mounting plate configured to mount to the mounting surface adjacent the first mounting bracket portion, and a fixation element configured to mount the mounting plate to the mounting surface. The second electrical cable second end is electrically connected to the first electrical cable second end via the fixation element. For example, in one such embodiment, the mounting plate can be nonconductive.

In a further embodiment of the assembly, the premise security device controller is configured to monitor the presence of the electrical circuit by monitoring at least one of electrical current and electrical resistance.

In a further embodiment of the assembly, each of the first electrical cable first end and the second electrical cable first end is electrically connected to the premise security device controller within the premise security device housing. And, each of the first electrical cable and the second electrical cable can extend through an interior of the mounting bracket.

In a further embodiment of the assembly, the premise security device includes a camera unit at the premise security device housing.

Another embodiment includes a method. This method embodiment includes the step of monitoring, via a premise security device controller of a premise security device, the presence of an electrical circuit. The premise security device includes a premise security device housing, and the premise security device controller is coupled to the premise security device housing. The premise security device housing is mounted to a mounting surface via a mounting bracket. The electrical circuit is formed between the premise security device controller, a first electrical cable, and a second electrical cable. The first electrical cable has a first electrical cable first end and a first electrical cable second end. The first electrical cable first end is electrically connected to the premise security device controller. The second electrical cable has a second electrical cable first end and a second electrical cable second end. The second electrical cable first end is electrically connected to the premise security device controller. When the premise security device housing is mounted to the mounting surface via the mounting bracket, the second electrical cable second end is electrically connected to the first electrical cable second end to form the electrical circuit between the premise security device controller and the electrically connected second electrical cable second end and first electrical cable second end. This method also includes the step of generating a tamper signal when the electrical circuit is no longer present.

In a further embodiment of this method, the premise security device controller generates the tamper signal when the second electrical cable second end is no longer electrically connected to the first electrical cable second end.

In a further embodiment of this method, the premise security device controller generates the tamper signal when one or both of the first electrical cable first end and the second electrical cable first end is no longer electrically connected to the premise security device controller.

In a further embodiment of this method, when the premise security device housing is no longer mounted to the mounting surface via the mounting bracket, the second electrical cable second end is no longer electrically connected to the first electrical cable second end.

In a further embodiment of this method, a fixation element mounts the mounting bracket to the mounting surface. The second electrical cable second end is electrically connected to the first electrical cable second end via the fixation element.

In a further embodiment of this method, a mounting plate is mounted to the mounting surface adjacent the mounting bracket. The second electrical cable second end is electrically connected to the first electrical cable second end via the mounting plate.

In a further embodiment of this method, a mounting plate is mounted to the mounting surface, via a fixation element, adjacent the mounting bracket. The second electrical cable second end is electrically connected to the first electrical cable second end via the fixation element.

In a further embodiment of this method, the premise security device controller is configured to monitor the presence of the electrical circuit by monitoring for a predetermined alteration in at least one of electrical current and electrical resistance.

The details of one or more examples are set forth in the accompanying drawings and the description below. Other features, objects, and advantages will be apparent from the description and drawings, and from the claims.

BRIEF DESCRIPTION OF DRAWINGS

The following drawings are illustrative of particular examples of the present invention and therefore do not limit the scope of the invention. The drawings are not necessarily to scale, though embodiments can include the scale illustrated, and are intended for use in conjunction with the explanations in the following detailed description wherein like reference characters denote like elements. Examples of the present invention will hereinafter be described in conjunction with the appended drawings.

DETAILED DESCRIPTION

The following detailed description is exemplary in nature and is not intended to limit the scope, applicability, or configuration of the invention in any way. Rather, the following description provides some practical illustrations for implementing examples of the present invention. Those skilled in the art will recognize that many of the noted examples have a variety of suitable alternatives.

Figure 1:
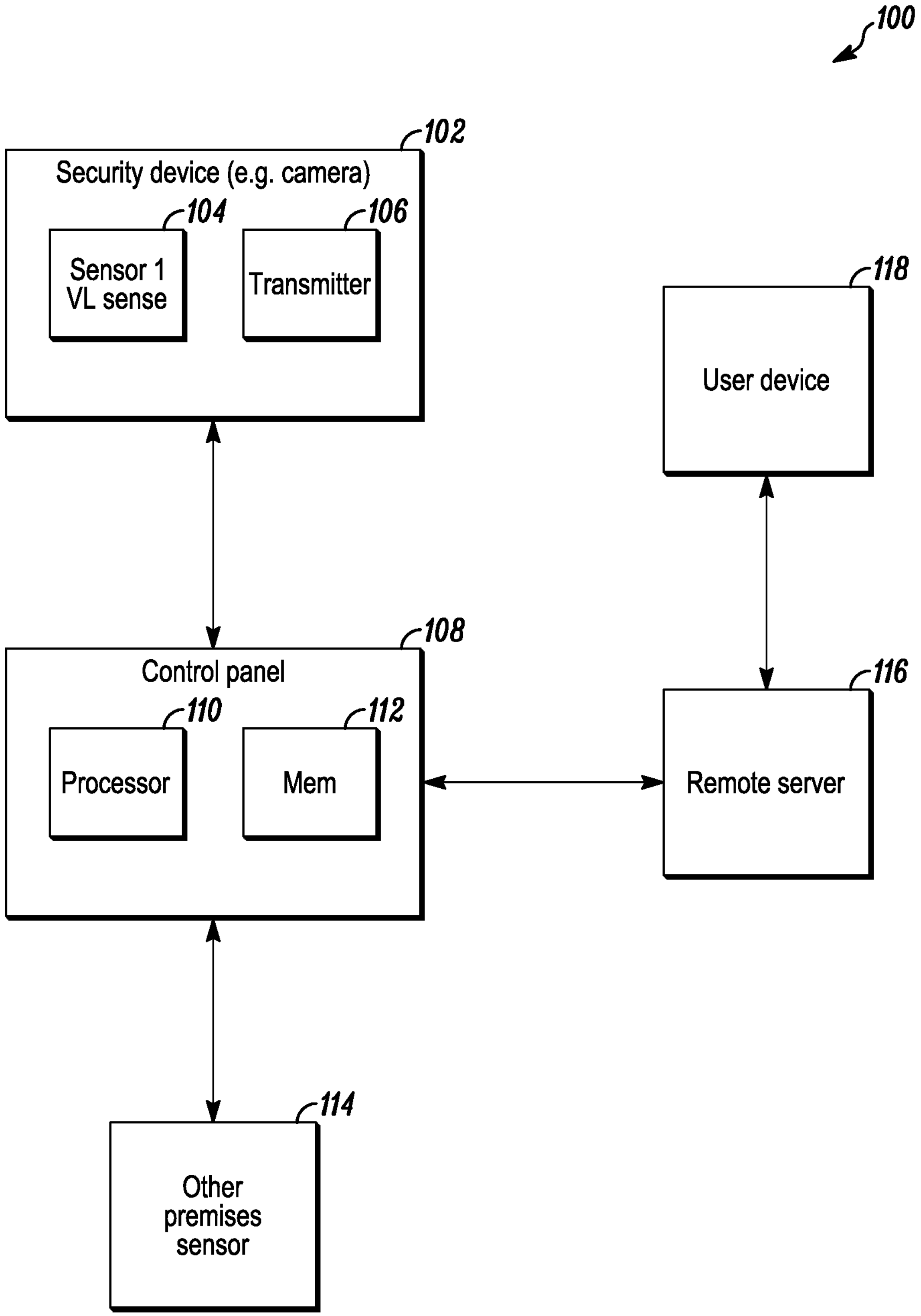
FIG. 1 is a block diagram of an example system including a premise security device according to an aspect of the present disclosure.

FIG. 1 is a block diagram of an example system 100 including a premise security device 102 according to an aspect of the present disclosure. The premise security device

102 can include one or more sensors 104 and a transmitter 106. The premise security device 102 can use the transmitter 106 to be in signal communication with a control panel 108. The control panel 108 can comprise one or more processors 110 and a non-transitory computer-readable storage article 112. The control panel 108 can be in signal communication with one or more other premise security devices 114 and with a remote server 116. In the illustrated embodiment, the remote server 116 is further in signal communication with a user device 118.

In some embodiments, the premise security device 102, the control panel 108, and the one or more other premise security devices 114 are each located at a common premise. In such embodiments, the remote server and user device can be at a location remote from the premise. However, in some embodiments, the user device can be carried with a user such that the user device is present at the premise when the user is present at the premise. In some embodiments, the user device 118 is a mobile computing device, such as a smartphone, tablet, or computer that executes an application and/or receives data wirelessly over a communication network to communicate with the control panel 108 via the remote server 116.

In FIG. 1, the premise security device 102 can be any type of premise security device and can include one or more sensors 104. For example, in some embodiments, the one or more sensors 104 of the premise security device 102 are visible light sensors (e.g. camera unit) which can record images of a scene within their field view. In some examples, the one or more sensors 104 of the premise security device 102 include a passive infrared (PIR) sensor and/or a motion detector. In some such embodiments, the PIR sensor and/or motion detector can detect motion in daytime or nighttime conditions. In some embodiments, one or more sensors 104 of the premise security device 102 comprise multiple sensors including a visible light sensor, a PIR sensor, and/or a motion detector. In some such embodiments, the PIR and/or motion detector can cause the visible light sensor to activate and record the target scene upon detecting a predetermined condition (e.g., motion, presence of an object, etc.). While a security device comprising a camera unit is described, the premise security device 102 can include other sensors such as thermal imaging sensors in addition to or in lieu of a camera unit. A person having ordinary skill will understand the premise security device 102 can comprise other devices and/or sensors and that this disclosure is not limited by the examples of premise security devices above.

As noted, the premise security device 102 can also include the transmitter 106. The transmitter 106 can enable the premise security device 102 to be in communication with the control panel 108. In some embodiments, the transmitter 106 is a wireless transmitter which can allow the premise security device 102 to send and receive signals wirelessly to the control panel 108. However, in some embodiments, the transmitter 106 is a wired transmitter which can allow the premise security device 102 to send and receive signals via a wire to the control panel 108. Using a wireless transmitter can be advantageous as the premise security device 102 need not be physically connected (e.g. via a wire) to the control panel 108 to send and receive signals with the control panel.

Continuing with the embodiment of FIG. 1, the control panel 108 includes the one or more processors 110 and the non-transitory computer-readable storage article 112. The one or more processors 110 are in communication with the non-transitory computer-readable storage article 112. In some embodiments, the one or more processors 110 comprise integrated circuits (e.g. FPGA, ASIC, microprocessor). In some embodiments, the one or more processors are part of a computing device. In some embodiments, the non-transitory computer-readable storage article 112 is a memory such as flash memory, optical memory, magnetic memory, and read only memory (ROM). The non-transitory computer-readable storage article 112 can be configured to comprise computer-executable instructions which can be executed by the one or more processors 110. For example, the non-transitory computer-readable storage article 112 can store a computer program which the one or more processors 110 of the control panel 108 can execute. Executing the computer-executable instructions can cause the one or more processors 110 to perform various actions as is described elsewhere herein.

In some embodiments, the control panel 108 is a premise control panel such as a home automation control panel and/or a security control panel. In some embodiments, the control panel 108 is an existing control panel which is used for operations such as home automation or security. In some such embodiments, the premise security device 102 can be integrated into the existing control panel using one or more inputs. For example, the premise security device 102 can be wired to one or more inputs on the control panel 108, thereby putting the premise security device 102 in signal communication with the control panel 108. The control panel 108 of FIG. 1 is in signal communication with the premise security sensor 102 and can receive signals from the premise security sensor 102 via the transmitter 106. Additionally, in some embodiments, the control panel 108 can send signals to the premise security device 102 through the transmitter 106. The control panel 108 can have many inputs and outputs and can be in signal communication with other parts of the system 100. As illustrated in the embodiment of FIG. 1, one or more other premise security devices 114 can be in signal communication with the control panel 108. The other premise security devices 114 can be any type of premise security devices and can include video cameras, motion detectors, glass break detectors, contact sensors for doors/windows, alarm push buttons, doorbells, door sensors, tilt sensors, and other devices, detectors, and sensors. In some embodiments, one or more of the other premise security devices 114 can include the same, or similar, sensors as the premise security device 102.

Continuing with the embodiment of FIG. 1, the control panel 108 is also in signal communication with the remote server 116. The remote server 116 can be a computing device located remotely from the control panel 108 and premises at which the control panel 108 is present. In some embodiments, the remote server 116 is internet connected and can send and receive data over the internet (e.g., with the control panel 108 and/or user device 118 via a WiFi connection at the control panel 108 and/or user device 118). The signal communication between the control panel 108 and the remote server 116 can be a wired connection and/or a wireless connection. In operation, the remote server 116 can send and receive signals from the control panel 108. The remote server 116 is also in signal communication with the user device 118 and can send and receive signals from the user device 118. The signal communication between the user device 118 and the remote server 116 can be a wireless connection and/or a wired connection.

In some embodiments, the user device 118 is an internet capable device which can send and receive signals wirelessly to the remote server 116 (e.g., via a WiFi connection at the user device 118). In some embodiments, the remote user device can include a display which can display notifications. For example, in some embodiments, the user device

118 is a phone, tablet, or computer which can receive information from the remote server 116 and display notifications which are related to the information received from remote server 116.

In an example operation of the embodiment of FIG. 1, the premise security device 102 includes a video camera which can record movement within the field of view of the video camera. In some embodiments, if the premise security device 102 detects movement, it can send an alert signal to the control panel 108 via the transmitter 106. The control panel 108 can receive the alert signal from the premise security device 102 and can further send the alert signal to the remote server 116. The remote server 116 can then send the signal to the user device 118 which can receive the signal and alert a user (e.g. via a display notification) that the premise security device has detected and recorded movement.

Figure 2:
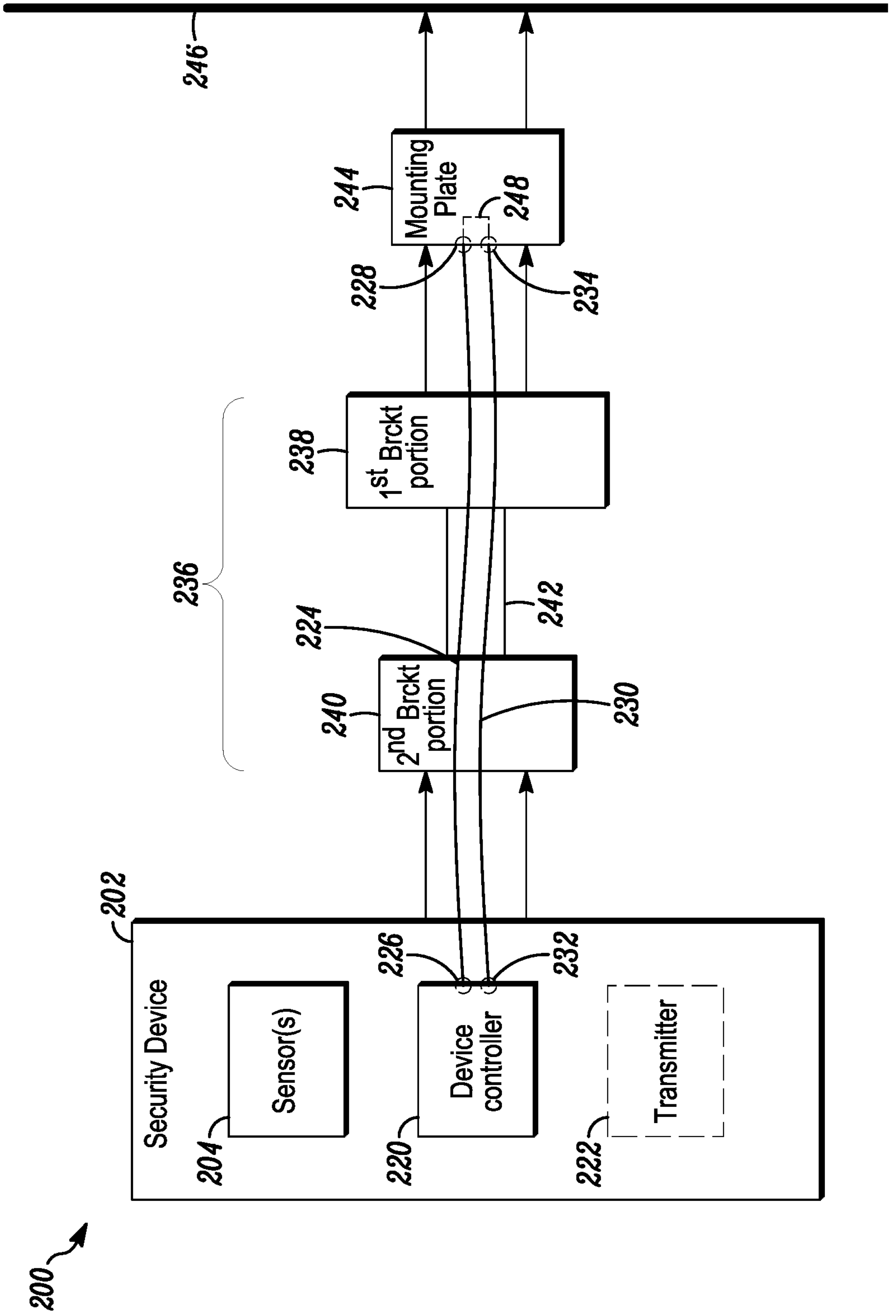
FIG. 2 is a block diagram of an example premise security device with a tamper protecting bracket according to an aspect of the present disclosure.

Moving to FIG. 2, FIG. 2 is a block diagram of an example premise security device 200 with a tamper protecting bracket according to an aspect of the present disclosure. The premise security device 200 includes a premise security device housing 202, one or more sensors 204, a premise security device controller 220, and, optionally, a transmitter 222. In some examples, the premise security device controller 220 is coupled to the premise security device housing 202. The premise security device controller 220 can be electrically connected to a first electrical cable 224 having a first electrical cable first end 226 and a first electrical cable second end 228. The premise security device controller 220 can be further electrically connected to a second electrical cable 230 having a second electrical cable first end 232 and a second electrical cable second end 234. Further, in the embodiment of FIG. 1, the premise security device housing 202 can be coupled to a mounting bracket 236 which can include a first mounting bracket portion 238 and a second mounting bracket portion 240. In some embodiments, the mounting bracket 236 has a mounting bracket arm 242 which connects the first mounting bracket portion 238 with the second mounting bracket portion 240. In some examples, such as that shown here, the mounting bracket 236 can be further coupled to a mounting plate 244 which is coupled to a mounting surface 246. However, in some examples, the mounting bracket 236 is coupled to the mounting surface 246 directly (e.g., without use of the mounting plate 244).

Continuing with the embodiment of FIG. 2, the premise security device 200 includes premise security device housing 202 which is coupled to the mounting surface 246. The premise security device housing 202 can be any size or shape and can be made of any material. In some embodiments, the premise security device housing 202 is made of a polymer material and can include multiple housing portions. In some such embodiments, the multiple housing portions can be coupled together to form the premise security device housing 202. In some embodiments, the premise security device housing 202 can define one or more holes through which the first electrical cable 224 and the second electrical cable 230 can extend through so as to extends within and outside of the device housing 202.

In the embodiment of FIG. 2, the premise security device housing 202 is directly coupled to the second mounting bracket portion 240 of the mounting bracket 236. The second mounting bracket portion 240 can be made of any material, but in some embodiments, the second mounting bracket portion 240 is made of a polymer material. The second mounting bracket portion 240 can be configured to couple to the premise security device housing 202. For example, in some embodiments, the premise security device housing 202 is coupled to the second mounting bracket portion 240 using one or more fasteners and/or clips. In some examples, the second mounting bracket portion 240 is configured to be moveably coupled to the premise security device housing 202.

In some embodiments, the second mounting bracket portion 240 is further coupled to the first mounting bracket portion 238 via a mounting bracket arm 242. The first mounting bracket portion 238 can be made of any material, but in some embodiments, the first mounting bracket portion 238 is made of a polymer material. The second mounting bracket portion 240 can include a coupling which couples with the mounting bracket arm 242. For example, the second mounting bracket portion 240 can include a ball which fits into a socket joint at the mounting bracket arm 242 (e.g. a ball and socket joint). In such an example, the ball and socket joint can allow for motion of the second mounting bracket portion 240 relative to the mounting bracket arm 242. This movement can be advantageous as the ball and socket joint can enable the premise security device housing 202, when coupled to the second mounting bracket portion 240, to be rotated and positioned into various positions and orientations as appropriate during operation. Further, in some embodiments, the mounting bracket arm 242 can be configured to tighten and loosen the ball and socket joint between the mounting bracket arm and the second mounting bracket portion 240. In such embodiments, the mounting bracket arm 242 can loosen to such a degree as to allow the second mounting bracket portion 240 to become uncoupled from the mounting bracket arm 242. In some embodiments, such as shown here, each of the first electrical cable 224 and the second electrical cable 230 can extend through an interior of the mounting bracket 236. In some such embodiments, the second mounting bracket portion 240 and/or the mounting bracket arm 242 can define one or more holes through which the first electrical cable 224 and the second electrical cable 230 can extend through. In some examples, the first electrical cable 224 and the second electrical cable 230 can extend through an interior of the ball and socket joint of the mounting bracket 236. A ball and socket joint between the second mounting bracket portion 240 and the mounting bracket arm 242 can be advantageous as it can allow movement of the second mounting bracket portion 240 without pulling or damaging the first electrical cable 224 and the second electrical cable 230 which can run through the ball and socket joint. However, in some embodiments, the first electrical cable 224 and the second electrical cable 230 can run outside of the mounting bracket 236 including the first mounting bracket portion 238 and the second mounting bracket portion 240. While a mounting bracket arm 242 has been described, some embodiments may not include a mounting bracket arm 242. For example, in such embodiments, the second mounting bracket portion 240 can be directly coupled to the first mounting bracket portion 238. Further, the second mounting bracket portion 240 can be adjustable without using the mounting bracket arm 242.

Continuing with the embodiment of FIG. 2, the first mounting bracket portion 238 of the mounting bracket 236 can be configured to be mounted to the mounting surface 246. In some embodiments, the first mounting bracket portion 238 of the mounting bracket is configured to be mounted to the mounting surface 246 directly, however, in some embodiments, the first mounting bracket portion 238 is configured to be mounted to the mounting surface 246 indirectly. For example, in some embodiments, the first mounting bracket portion 238 is configured to be mounted to a mounting plate 244 which is mounted to the mounting surface 246 as a means of indirect mounting. The mounting plate 244 can be made of any material. In some examples, the mounting plate 244 is made of a conductive material such as metal, while in some examples, the mounting plate 244 is made of a nonconductive material such as a polymer material. In the embodiment of FIG. 2, the mounting plate 244 is configured to be mounted to the mounting surface 246 adjacent to the first mounting bracket portion 238, with the first mounting bracket portion 238 also being configured to be mounted to the mounting surface 246. The first mounting bracket portion 238 can also be configured to mount to the mounting surface 246 over the mounting plate 244 such that each of the first mounting bracket portion 238 and the mounting plate 244 are directly mounted to the mounting surface 246. In some embodiments, part of the first mounting bracket portion 238 can be recessed in the mounting surface 246 when the first mounting bracket portion 238 is mounted to the mounting surface 246. Similarly, in some embodiments, part of the mounting plate 244 can be recessed in the mounting surface 246 when the mounting plate 244 is mounted to the mounting surface 246. The first mounting bracket portion 238 can be mounted to the mounting surface using one or more fixation elements (e.g. fasteners). In some such embodiments, the one or more fixation elements can be configured to mount the first mounting bracket portion 238 to the mounting surface 246. In some embodiments, the mounting plate 244 is mounted to the mounting surface 246 using one or more fixation elements (e.g. fasteners). In some such embodiments, the one or more fixation elements can be configured to mount the mounting plate 244 to the mounting surface 246.

In the embodiment of FIG. 2, the first electrical cable 224 is electrically connected to the premise security device controller 220 via the first electrical cable first end 226. The second electrical cable 230 is also electrically connected to the premise security device controller 220 via the second electrical cable first end 232. As illustrated in FIG. 2, the premise security device housing 202 can be coupled to the second mounting bracket portion 240. When the premise security device housing 202 is coupled to the second mounting bracket portion 240, the second electrical cable second end 234 can be electrically connected to the first electrical cable second end 228 to form an electrical circuit. The electrical circuit formed can be between i) the premise security device controller 220, and ii) the electrically-connected second electrical cable second end 234 and the first electrical cable second end 228. Additionally, the assembly of FIG. 2 can be configured such that when the premise security device housing 202 is uncoupled from the second mounting bracket portion 240, the second electrical cable second end 234 is no longer electrically connected to the first electrical cable second end 228.

Continuing with FIG. 2, the first electrical cable second end 228 and the second electrical cable second end 234 can be electrically coupled, as schematically illustrated by electrical connection 248, shown here via the mounting plate 244. In such embodiments, the mounting plate 244 is electrically conductive (e.g. made of electrically conductive material) and can allow electrical voltage and/or current to travel through the mounting plate 244 from the second end of one of the first electrical cable 224 or the second electrical cable 230 to the second end of the other one of the first electrical cable 224 or the second electrical cable 230. As described elsewhere herein, the first electrical cable first end 226 and the second electrical cable first end 232 are electrically connected to the premise security device controller 220. Thus, when the first electrical cable second end 228 and the second electrical cable second end 234 are electrically connected (e.g. via mounting plate 244) an electrical circuit is formed. The electrical circuit can be formed between the premise security device controller 220, where the first electrical cable first end 226 and the second electrical cable first end 232 are electrically connected, and the electrically-connected second electrical cable second end 234 and first electrical cable second end 228.

In some examples, the premise security device controller 220 can monitor the presence of the electrical circuit. In some examples, the premise security device controller 220 is configured to monitor the presence of the electrical circuit by monitoring at least one of electrical current and electrical resistance. For example, the premise security device controller 220 can determine if the electrical circuit is present if it detects, for instance, an increased current and/or a reduced resistance beyond a predetermined threshold. In some examples, the premise security device controller 220 can determine if the electrical circuit is present if it detects a predetermined alteration in at least one of electrical current and electrical resistance. For example, the premise security device controller 220 can detect a drop in current of a predetermined threshold and, as a result, can determine that the electrical circuit is no longer present.

In some such examples, the premise security device can generate a signal (e.g. a tamper signal) when the electrical circuit is no longer present. By monitoring the electrical circuit and generating a signal when the electrical circuit is no longer present, the premise security device controller 220 can determine when the first electrical cable 224 and/or the second electrical cable 230 has been disconnected. For example, in some embodiments, the premise security device controller 220 can be configured to generate a tamper signal when the second electrical cable second end 234 is no longer electrically connected to the first electrical cable second end 228. This condition can happen, for instance, if the first mounting bracket portion is removed from the mounting surface. Additionally or alternatively, in some embodiments, the premise security device controller 220 is configured to generate the tamper signal when one or both of the first electrical cable first end 226 and the second electrical cable first end 232 is no longer electrically connected to the premise security device controller. This condition can happen, for instance, if the premise security device housing 202 is removed from the second mounting bracket portion 240 of the mounting bracket 236.

In further examples, the premise security device controller can determine that the first electrical cable 224 has been cut, ripped, or otherwise damaged. The cutting, ripping, or otherwise damaging of the first electrical cable 224 and/or the second electrical cable 230 can happen during various tampering conditions. For example, the premise security device 200 can be pulled away from the mounting bracket 236, the premise security device housing 202 can be forcefully pulled apart into a first housing portion and a second housing portion, and/or the mounting bracket 236 can be pulled away from either the mounting surface 246 and/or the mounting plate 244. In such examples, one of the first electrical cable 224 or the second electrical cable 230 can be damaged which can cause the electrical circuit to be disconnected. Thus, the premise security device controller 220 can monitor the electrical circuit formed by the first electrical cable 224 and the second electrical cable 230 to determine if any of the above tampering conditions, or similar conditions, have occurred. It can be advantageous to use a first electrical cable and a second electrical cable along with a premise security device controller 220 to monitor for tampering conditions as forceful removal of any portion of the assembly can cause the premise security device controller 220 to generate a tamper signal.

In some embodiments, once the premise security device controller 220 generates a tamper signal, the transmitter 222 can transmit the tamper signal. In some embodiments, the transmitter 222 wirelessly transmits the tamper signal to a control panel (e.g. 108 of FIG. 1). In some embodiments, the transmitter transmits the tamper signal to the control panel via a wired connection. However, it can be advantageous to use a wireless transmitter as forceful removal of the premise security device housing 202 can happen before wired transmission of a tamper signal can take place.

Figure 3:
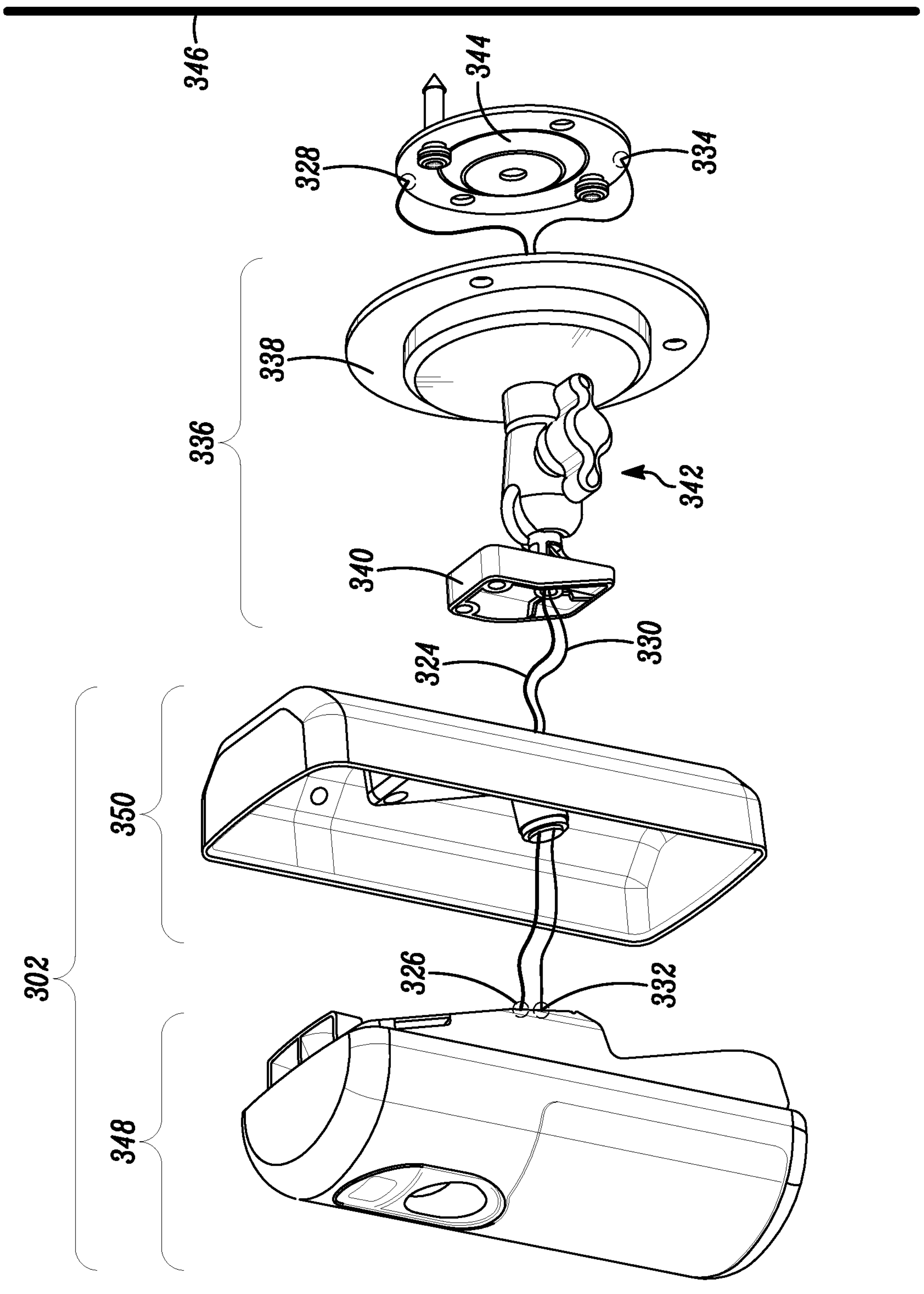
FIG. 3 is an isometric view of one embodiment of a premise security device with a tamper protecting bracket according to an aspect of the present disclosure.

Moving to FIG. 3, is an isometric view of one embodiment of a premise security device with a tamper protecting bracket according to an aspect of the present disclosure. The embodiment includes a premise security device housing 302 which comprises a first housing portion 348 and a second housing portion 350. The embodiment further includes a mounting bracket 336 comprising a first mounting bracket portion 338 and a second mounting bracket portion 340 which can be connected by a mounting bracket arm 342. The embodiment also includes a mounting plate 344 and a mounting surface 346. A first electrical cable 324 having a first electrical cable first end 326 and a first electrical cable second end 328 is included along with a second electrical cable 330 having a second electrical cable first end 332 and a second electrical cable second end 334.

In the embodiment of FIG. 3, the first electrical cable 324 and the second electrical cable 330 extend through various components. As described elsewhere in this disclosure, the first electrical cable first end 326 and the second electrical cable first end 332 are electrically connected to a premise security device controller (e.g. 220 of FIG. 2). In this embodiment, the first electrical cable second end 328 and the second electrical cable second end 334 are in electrical connection with each other through mounting plate 344 which is made of a conductive material. This connection results in an electrical circuit which can be monitored by the premise security device controller. In this example, the mounting plate 344 is mounted to the mounting surface 346 and is covered by the mounting bracket 336. The mounting bracket 336 can be independently mounted to the mounting surface 346 (e.g., via separate fastener(s) extending through the mounting bracket 336) adjacent the mounting plate 344. In operation, the premise security device controller can monitor the electrical circuit created by the first electrical cable 324 and the second electrical cable 330 and determine if the circuit becomes disconnected. Covering the mounting plate with the mounting bracket 336 (e.g., the first mounting bracket portion 338) can be advantageous as an intruder may not immediately be visually aware of the existence of the mounting plate as associated electrical cables 324, 330 providing the tamper detection functionality. Thus, should a person attempt to remove the mounting bracket 336 from the mounting surface 346, the mounting plate 344 would remain mounted to the mounting surface 346 and the premise security device controller would generate a tamper signal.

Figure 4:
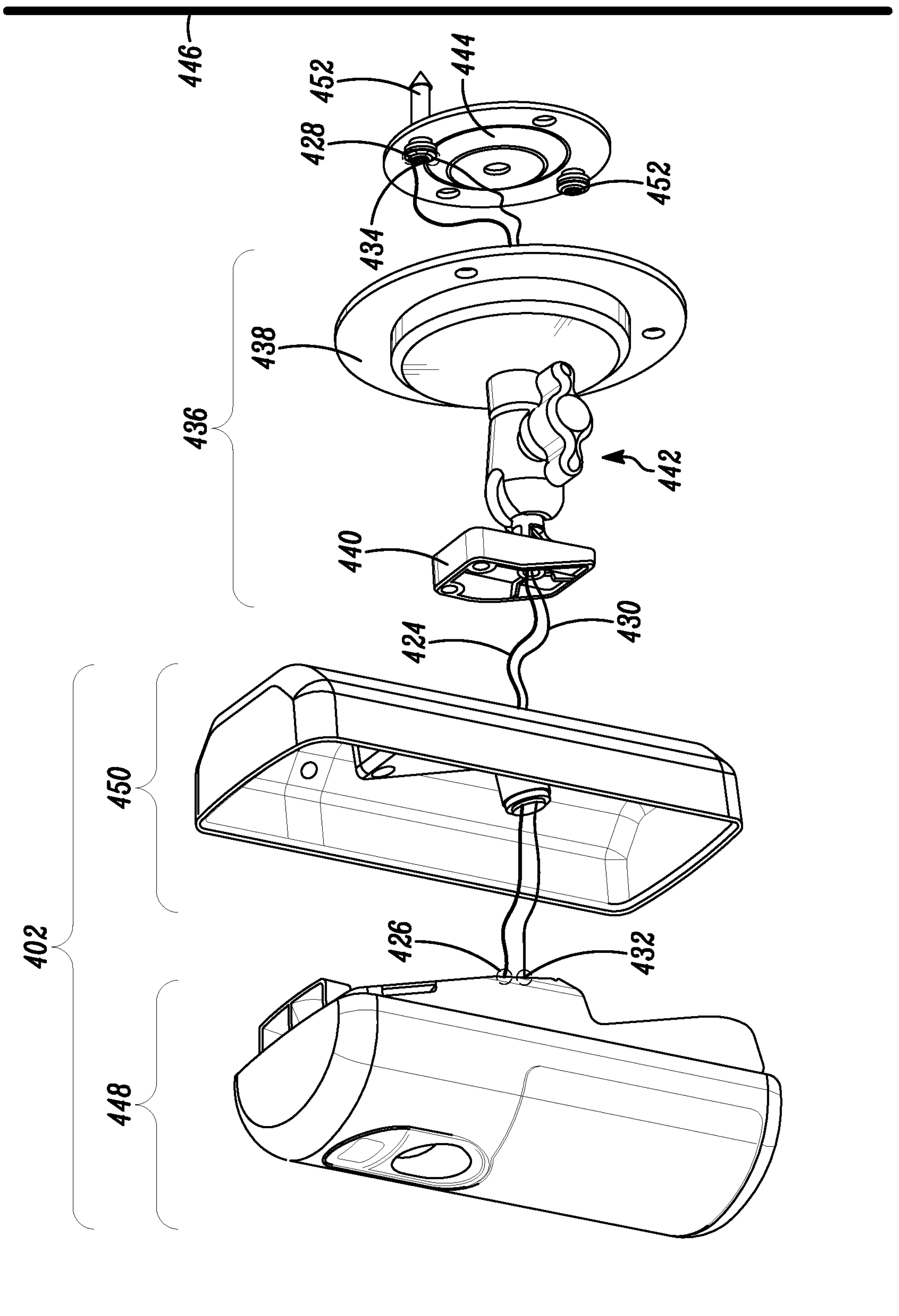
FIG. 4 is an isometric view of another embodiment of a premise security device with a tamper protecting bracket according to an aspect of the present disclosure.

Moving to FIG. 4, FIG. 4 is an isometric view of another embodiment of a premise security device with a tamper protecting bracket according to an aspect of the present disclosure. The embodiment includes a premise security device housing 402 which comprises a first housing portion 448 and a second housing portion 450. The embodiment further includes a mounting bracket 436 comprising a first mounting bracket portion 438 and a second mounting bracket portion 440 which can be connected by a mounting bracket arm 442. The embodiment also includes a mounting plate 444 mounted to a mounting surface 446 with one or more fixation elements 452. A first electrical cable 424 having a first electrical cable first end 426 and a first electrical cable second end 428 is included along with a second electrical cable 430 having a second electrical cable first end 432 and a second electrical cable second end 434.

In the embodiment of FIG. 4, the first electrical cable 424 and the second electrical cable 430 extend through various components. As described elsewhere in this disclosure, the first electrical cable first end 426 and the second electrical cable first end 432 are electrically connected to a premise security device controller (e.g. 220 of FIG. 2). In this embodiment, the first electrical cable second end 428 and the second electrical cable second end 434 are in electrical connection with each other via one of the one or more fixation elements 452 which is made of a conducting material. This connection results in an electrical circuit which can be monitored by the premise security device controller. In operation, the premise security device controller can monitor the electrical circuit created by the first electrical cable 424 and the second electrical cable 430 and determine if the circuit becomes disconnected. By creating the electrical circuit using a fixation element 452 rather than the mounting plate 444 as in the embodiment of FIG. 3, the mounting plate 444 need not be made of a conducting material. For example, the mounting plate 444 can be a nonconducting material while the one or more fixation elements 452 are a conductive material. Using a nonconductive mounting plate can be advantageous as it can reduce costs and complexity of installation. However, in some examples described elsewhere herein, the one or more fixation elements 452 and the mounting plate 444 are conductive material.

Figure 5:
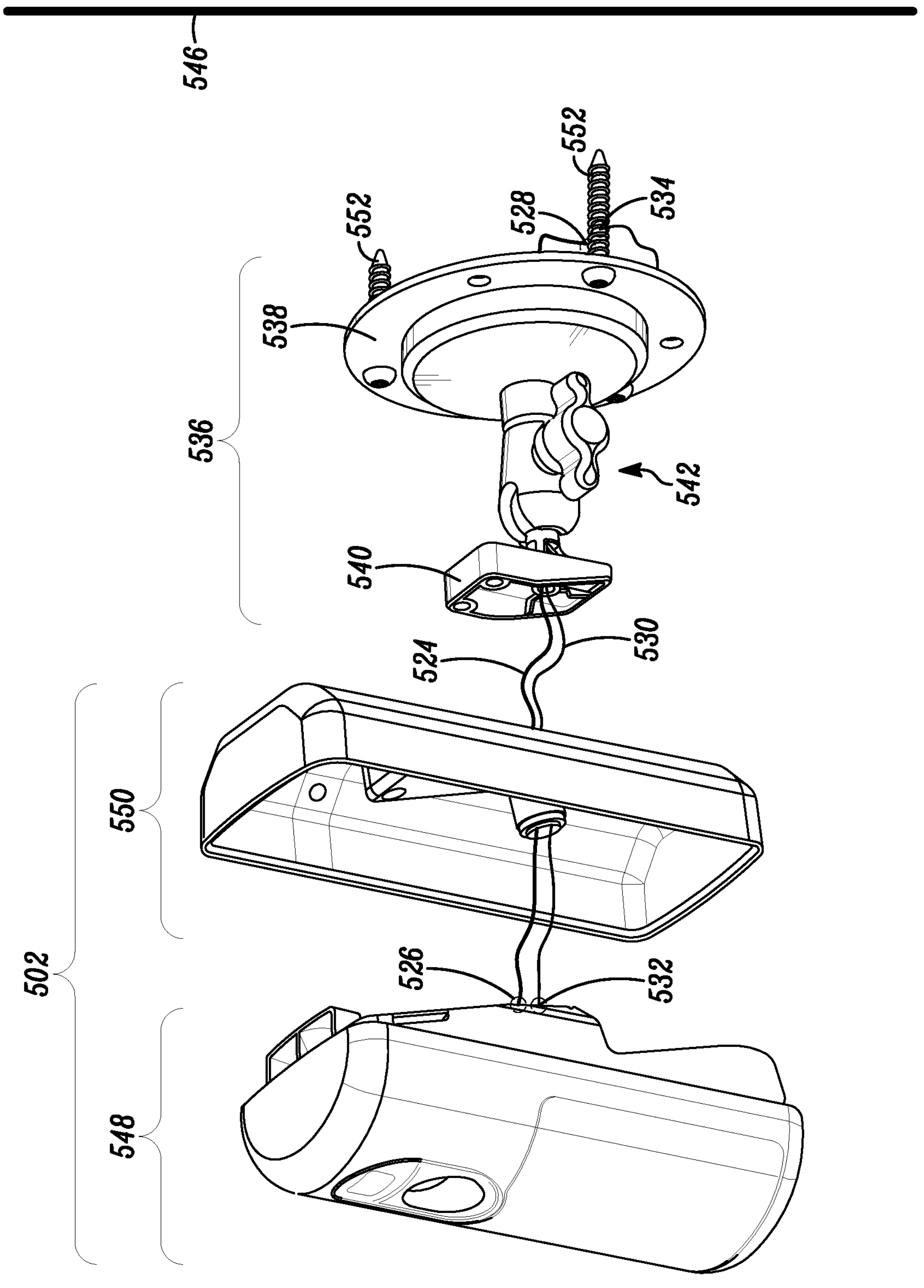
FIG. 5 is an isometric view of another embodiment of a premise security device with a tamper protecting bracket according to an aspect of the present disclosure.

Moving to FIG. 5, FIG. 5 is an isometric view of another embodiment of a premise security device with a tamper protecting bracket according to an aspect of the present disclosure. The embodiment includes a premise security device housing 502 which comprises a first housing portion 548 and a second housing portion 550. The embodiment further includes a mounting bracket 536 comprising a first mounting bracket portion 538 and a second mounting bracket portion 540 which can be connected by a mounting bracket arm 542. Contrary to the embodiments of FIG. 3 and FIG. 4, the embodiment of FIG. 5 does not include a mounting plate. In the embodiment of FIG. 5, the first mounting bracket portion 538 is mounted to the mounting surface 546 using one or more fixation elements 552. A first electrical cable 524 having a first electrical cable first end 526 and a first electrical cable second end 528 is included along with a second electrical cable 530 having a second electrical cable first end 532 and a second electrical cable second end 534.

In the embodiment of FIG. 5, the first electrical cable 524 and the second electrical cable 530 extend through various components. As described elsewhere in this disclosure, the first electrical cable first end 526 and the second electrical cable first end 532 are electrically connected to a premise security device controller (e.g. 220 of FIG. 2). In this embodiment, the first electrical cable second end 528 and the second electrical cable second end 534 are in electrical connection with each other via one of the one or more fixation elements 552 which is made of a conducting material. This connection results in an electrical circuit which can be monitored by the premise security device controller. In operation, the premise security device controller can monitor the electrical circuit created by the first electrical cable 524 and the second electrical cable 530 and determine if the circuit becomes disconnected. By creating the electrical circuit using a fixation element 552 rather than a mounting plate as in the embodiment of FIG. 3, no mounting plate is required. For example, the first mounting bracket portion 538 of the mounting bracket 536 can be directly mounted to the mounting surface 546. Not using a mounting plate can be advantageous as it can reduce costs and complexity of installation. Further, the mounting bracket portion need not be made of an electrically conductive material.

Figure 6:
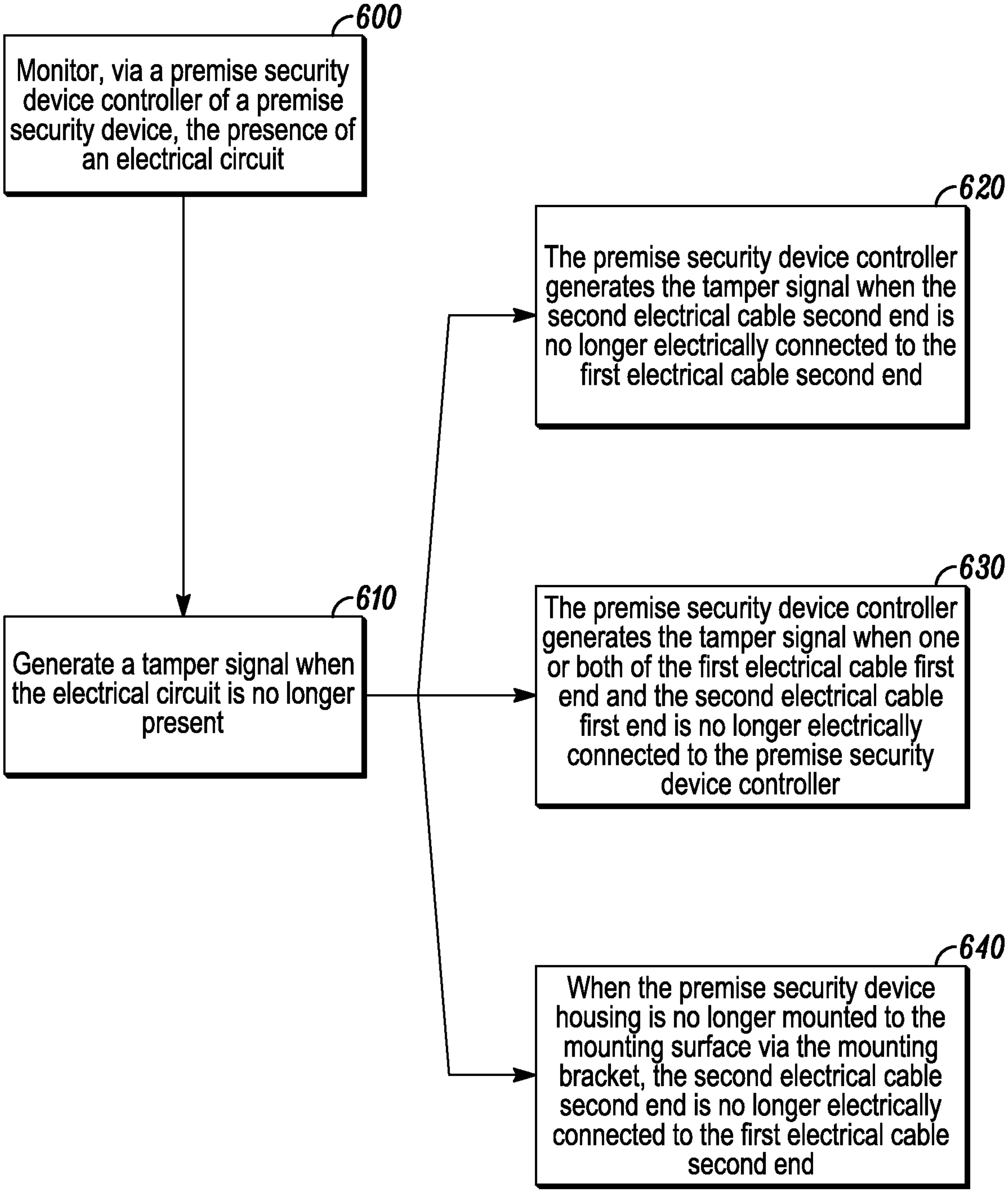
FIG. 6 is a flow diagram of an example method of generating a tamper signal using a tamper protecting bracket according to an aspect of the present disclosure.

FIG. 6 is a flow diagram of an example method of generating a tamper signal using a tamper protecting bracket according to an aspect of the present disclosure. The method starts with step 600 which is to monitor, via a premise security device controller of a premise security device, the presence of an electrical circuit. Various structures to monitor the presence of an electrical circuit are described elsewhere in this disclosure. The method continues with step 610 which is to generate a tamper signal when the electrical circuit is no longer present. Some cases in which the electrical circuit is no longer present, as detected by the premise security device controller, are shown by elements 620-650. In 620, the premise security device generates the tamper signal when the second electrical cable second end is no longer electrically connected to the first electrical cable second end. In 630, the premise security device controller generates the tamper signal when one or both of the first electrical cable first end and the second electrical cable first end is no longer electrically connected to the premise security device controller. In 640, when the premise security device housing is no longer mounted to the mounting surface via the mounting bracket, the second electrical cable second end is no longer electrically connected to the first electrical cable second end. This can cause the premise security device controller to generate the tamper signal. Other cases in which the electrical circuit is no longer present, as detected by the premise security device controller, are contemplated and a person having ordinary skill will appreciate this disclosure is not limited to the listed examples.

Various examples have been described. These and other examples are within the scope of the following claims.

What is claimed is:

1. An assembly comprising:

a premise security device including a premise security device housing and a premise security device controller, the premise security device controller being coupled to the premise security device housing;

a mounting bracket including a first mounting bracket portion mounted to a mounting surface and a second mounting bracket portion coupled to the premise security device housing;

a first electrical cable having a first electrical cable first end and a first electrical cable second end, the first electrical cable first end electrically connected to the premise security device controller; and a second electrical cable having a second electrical cable first end and a second electrical cable second end, the second electrical cable first end electrically connected to the premise security device controller, and, when the premise security device housing is coupled to the second mounting bracket portion, the second electrical cable second end is electrically connected to the first electrical cable second end to form an electrical circuit between the premise security device controller and the electrically connected second electrical cable second end and first electrical cable second end, wherein the premise security device controller monitors the presence of the electrical circuit and generate a tamper signal when the electrical circuit is no longer present.

2. The assembly of claim 1, wherein the premise security device controller generates the tamper signal when the second electrical cable second end is no longer electrically connected to the first electrical cable second end.

3. The assembly of claim 1, wherein the premise security device controller generate the tamper signal when one or both of the first electrical cable first end and the second electrical cable first end is no longer electrically connected to the premise security device controller.

4. The assembly of claim 1, wherein the assembly is configured such that when the premise security device housing is uncoupled from the second mounting bracket portion the second electrical cable second end is no longer electrically connected to the first electrical cable second end.

5. The assembly of claim 1, further comprising:

a fixation element mounts the first mounting bracket portion to the mounting surface, wherein the second electrical cable second end is electrically connected to the first electrical cable second end via the fixation element.

6. The assembly of claim 1, further comprising:

a mounting plate mounts to the mounting surface adjacent the first mounting bracket portion, wherein the second electrical cable second end is electrically connected to the first electrical cable second end via the mounting plate.

7. The assembly of claim 6, wherein the first mounting bracket portion is mounted to the mounting surface over the mounting plate.

8. The assembly of claim 1, further comprising:

a mounting plate mounts to the mounting surface adjacent the first mounting bracket portion; and a fixation element mounts the mounting plate to the mounting surface, wherein the second electrical cable second end is electrically connected to the first electrical cable second end via the fixation element.

9. The assembly of claim 8, wherein the mounting plate is nonconductive.

10. The assembly of claim 1, wherein the premise security device controller monitors the presence of the electrical circuit by monitoring at least one of electrical current and electrical resistance.

11. The assembly of claim 1, wherein each of the first electrical cable first end and the second electrical cable first end is electrically connected to the premise security device controller within the premise security device housing, and wherein each of the first electrical cable and the second electrical cable extend through an interior of the mounting bracket.

12. The assembly of claim 1, wherein the premise security device includes a camera unit at the premise security device housing.

13. A method comprising the steps of:

monitoring, via a premise security device controller of a premise security device, the presence of an electrical circuit, the premise security device includes a premise security device housing and the premise security device controller is coupled to the premise security device housing, wherein the premise security device housing is mounted to a mounting surface via a mounting bracket, wherein the electrical circuit is formed between the premise security device controller, a first electrical cable, and a second electrical cable, wherein the first electrical cable has a first electrical cable first end and a first electrical cable second end, the first electrical cable first end electrically connected to the premise security device controller, wherein the second electrical cable has a second electrical cable first end and a second electrical cable second end, the second electrical cable first end electrically connected to the premise security device controller, and, when the premise security device housing is mounted to the mounting surface via the mounting bracket, the second electrical cable second end is electrically connected to the first electrical cable second end to form the electrical circuit between the premise security device controller and the electrically connected second electrical cable second end and first electrical cable second end; and generating a tamper signal when the electrical circuit is no longer present.

14. The method of claim 13, wherein the premise security device controller generates the tamper signal when the second electrical cable second end is no longer electrically connected to the first electrical cable second end.

15. The method of claim 13, wherein the premise security device controller generates the tamper signal when one or both of the first electrical cable first end and the second electrical cable first end is no longer electrically connected to the premise security device controller.

16. The method of claim 13, wherein when the premise security device housing is no longer mounted to the mounting surface via the mounting bracket the second electrical cable second end is no longer electrically connected to the first electrical cable second end.

17. The method of claim 13, wherein a fixation element mounts the mounting bracket to the mounting surface, and wherein the second electrical cable second end is electrically connected to the first electrical cable second end via the fixation element.

18. The method of claim 13, wherein a mounting plate is mounted to the mounting surface adjacent the mounting bracket, and wherein the second electrical cable second end is electrically connected to the first electrical cable second end via the mounting plate.

19. The method of claim 13, wherein a mounting plate is mounted to the mounting surface, via a fixation element, adjacent the mounting bracket, and wherein the second electrical cable second end is electrically connected to the first electrical cable second end via the fixation element.

20. The method of claim 13, wherein the premise security device controller monitors the presence of the electrical circuit by monitoring for a predetermined alteration in at least one of electrical current and electrical resistance.

* * * * *